United States Patent
Brown (10) Patent No.: US 6,789,501 B2
(45) Date of Patent: Sep. 14, 2004

(54) REPLACEABLE LINER AND TEAT CUP SHELL FOR A TEAT CUP ASSEMBLY AND METHOD

(75) Inventor: Stan A. Brown, Hanford, CA (US)

(73) Assignee: Beco Dairy Automation, Inc., Hanford, CA (US)

( * ) Notice: Subject to any disclaimer, the term of this patent is extended or adjusted under 35 U.S.C. 154(b) by 0 days.

(21) Appl. No.: 10/411,776

(22) Filed: Apr. 10, 2003

(65) Prior Publication Data

US 2003/0192479 A1 Oct. 16, 2003

Related U.S. Application Data

(60) Provisional application No. 60/372,262, filed on Apr. 12, 2002.

(51) Int. Cl.[7] ............................................. A01J 5/04
(52) U.S. Cl. ................................................. 119/14.47
(58) Field of Search .......................... 119/14.47, 14.02, 119/14.49

(56) References Cited

U.S. PATENT DOCUMENTS

| | | | |
|---|---|---|---|
| 4,745,881 A | 5/1988 | Larson | 119/14.51 |
| 4,756,275 A | 7/1988 | Larson | 119/14.49 |
| 4,964,368 A | 10/1990 | Ball et al. | 119/14.49 |
| 5,482,004 A | 1/1996 | Chowdhury | 119/14.52 |
| 5,493,995 A * | 2/1996 | Chowdhury | 119/14.47 |
| 5,572,947 A | 11/1996 | Larson et al. | 119/14.51 |
| 5,666,904 A | 9/1997 | Grindal | 119/14.02 |
| 5,857,424 A | 1/1999 | Johnston | 119/14.47 |
| 5,979,358 A | 11/1999 | Ornerfors et al. | 119/14.02 |
| 6,039,001 A | 3/2000 | Sanford | 119/14.47 |
| 6,058,879 A | 5/2000 | Miefalk | 119/14.47 |
| 6,164,243 A | 12/2000 | Larson | 119/14.49 |
| 6,176,200 B1 | 1/2001 | Petterson | 119/14.47 |
| D447,840 S | 9/2001 | Alveby et al. | D30/199 |
| 6,308,656 B1 | 10/2001 | Milbrath et al. | 119/14.47 |
| 6,435,132 B1 * | 8/2002 | Milbrath et al. | 119/14.47 |
| 6,546,893 B1 * | 4/2003 | Happel et al. | 119/14.47 |
| 6,588,364 B1 * | 7/2003 | Petterson | 119/14.47 |

* cited by examiner

Primary Examiner—Elizabeth Anne Shaw
(74) Attorney, Agent, or Firm—Daniel J. Meaney, Jr.

(57) ABSTRACT

A liner for use with a teat cup having a rigid hollow shell having a central aperture is shown. The liner comprises a teat chamber having an opening which extends axially therethrough and terminates in a distal end and which has an axial length greater in length than a length of a teat terminating in a distal tip which is to be inserted into the teat chamber. The liner includes a transition chamber having an axially extending reducing inner passageway which has an inlet contiguous to and communicating with the opening in the distal end. The transition chamber defines thereon a circumferentially extending cuff member configured to be passed through a central aperture in a shell and to them surround and urge the cuff member against a shell. A milk tube communicates with the outlet of the transition chamber.

19 Claims, 11 Drawing Sheets

REPLACEABLE LINER AND TEAT CUP SHELL FOR A TEAT CUP ASSEMBLY AND METHOD

CROSS-REFERENCES TO RELATED APPLICATIONS

This Application claims the benefit, under Title 35, United States Code §119(e), of U.S. Provisional Patent Application Serial No. 60/372,262 filed Apr. 12, 2002.

STATEMENT REGARDING FEDERALLY SPONSORED RESEARCH OR DEVELOPMENT

Not Applicable

REFERENCE TO A "MICROFICHE APPENDIX" (SEE 37 CFR 1.96)

Not Applicable

BACKGROUND OF THE INVENTION

1. Field of the Invention

The present invention relates to teat cup assemblies having a teat cup having a rigid, outer shell and tubular liner and more particularly to a teat cup shell and replaceable liner for a teat cup shell wherein the axial length of the shell and liner are configured to be assembled into a teat cup assembly wherein the liner has a teat chamber having an opening extending axially therethrough and terminates in a distal end having an axial length which is greater in length than a length of a teat terminating in a distal tip to be inserted into the teat chamber positioning a distal tip of a teat in the axially extending opening in a spaced relationship from the distal end of the teat chamber to eliminate application of differential collapsing pressure during a milking operates to the teat by using the teaching of the invention, a substantially uniform milking pressure is applied to the teat including the distal end thereof to obtained improved milking of a cow while reducing trauma on the teats during milking operations.

2. Description of the Prior Art

It is known in the art for milking machines to utilize teat cup assemblies which are attached to a cow's teat for purposes of milking the cow. Typically, teat cup assemblies include a hollow rigid outer shell and a resilient, tubular shaped liner sometimes referred to as inflation. The hollow, rigid outer shell of a teat cup assembly includes a vacuum inlet which is operatively connected to a pulsating vacuum line to selectively apply a milking vacuum and atmosphere pressure to the interior of the shell as is well known in the art. Typically, a tubular shaped liner is loaded into the shell in a manner to form a seal at both the mouthpiece opening of the rigid outer shell and a central aperture located at the opposite end of the shell. The tubular liner has a portion thereof, including a milk tube, which extends through and beyond the central aperture of the shell.

During a milking operation, a teat cup assembly is attached to the cow and the cow teats are inserted through an opening of the mouthpiece of the liner and into the teat chamber of the tubular liner.

A pulsating vacuum line is operatively connected to the inlet on the shell to alternatively apply a vacuum an atmosphere to the teat cup assemblies for milking the cow all is known to persons skilled in the art.

Typically, the tubular liner needs to be replaced in the order of every seven (7) to ten (10) days. This is due to the fact that the opening in the mouthpiece does not maintain an adequate seal around the peripheral of the cow's teat and the efficiency of the milking operations is degraded to the degradation of the sealing relationship between the mouthpiece opening and the cows teat. The opening and the closing of the liner during the milking operation applies torsional forces to the mouthpiece of the liner resulting in the degradation of the sealing relationship, over time, with the cow's teat.

It is also known in the art that dairy cows today produce milk at substantially higher milk flows. To compensate the substantially higher milk flows, the inside diameter of the milk flow tube is increased to diameter in order to accommodate the increase in milk flow. As the result of the increase in milk flow, the milking vacuum applied to the milk tube is interrupted causing milk back flow to the teat which is undesirable as milk back blow causes trauma and disease to the cow's teat.

Numerous attempts have been made to improve the design of the tubular liner to accommodate the increased milk flow and to prevent application of undue stress onto the cow's teat during milking. Specially constructed liners which have been designed to permit substantial relative bending of portions of the milking tube are disclosed in U.S. Pat. Nos. 4,756,275 and 4,745,881.

U.S. Pat. No. 5,725,947 discloses, particularly at FIG. 4, thereof, the formation of a pair of spaced grooves located in the liner just beyond the central aperture of a shell to permit a teat cup assembly of a milking machine to be folded towards the stem portion to a folded over position thereby crimping the milking tube when it is not possible to install a teat cup on one of the cow's teats in the event that a cow has a missing, mal-formed diseased or damaged teat which cannot be milked or where a teat milks faster than other teats and it is necessary to disable operation of one of the teat cup assemblies on a milking machine.

U.S. Pat. Nos. 6,308,656; 6,176,200; 6,164,243; 6,058,879; 6,039,001; 5,979,358; 5,857,424; 5,666,904; 5,572,947; 5,482,004 and 4,964,368 disclose various teat cup assemblies, teat cup liners and milk machines using teat cup assemblies, all of which utilize a teat liner having various features for positioning a milking machine teat cup on to a cow's teat and for improving a milking of a cow during a milking operation utilizing a milking machine.

U.S. Design Pat. No. D447,840 discloses a teat cup liner wherein the milking tube discharge has an outer surface which is formed into an annular ring having a plurality of space axially extending grooves.

All of the prior art liners including the liners disclosed and taught by the above described prior art are structured such that the distal tip of a cow's teat is inserted through an opening in the mouthpiece of the liner and is advanced into the teat chamber to the position the distal tip in a location where the teat chamber has a relatively thick sidewall where the teat chamber makes a transition into the inlet of a milk tube.

In the prior art liners, the thicker portion of the teat chamber having a sidewall when subjected to atmosphere during a milking process causing the teat liner to collapse and apply a milking force to the cow's teat results in the thin walled teat chamber applying a greater force to the cow's teat and a smaller force on the distal tip, due to the resistance of the thicker sidewall portion which results in the application of a differential milking force being applied to the distal tip of the cow's teat which causes trauma thereto during the milking operation.

The application of a differential milking force to the cow's teat including the distal tip is undesirable and causes trauma and disease which can be reduced or possibly eliminated using the teachings of the present invention.

BRIEF SUMMARY OF THE INVENTION

The present invention seeks to overcome the problems of the prior art by providing a replaceable liner for use with a teat cup shell in a milking system wherein the teat chamber achieves an improved and more complete teat distal tip massage during milking.

This is accomplished by using a liner which is specifically structured for use with a teat cup having a rigid hollow shell with a central aperture formed at one end thereof and wherein the axial length of the teat cup hollow shell has a greater length then the length of the teat cup shells known in the art.

In the present invention, the liner includes a teat chamber having an opening extending axially therethrough. The teat chamber terminates at a distal end and has an axial length which is greater in length than a length of a teat terminating in a distal tip to be inserted into the teat chamber. As a result of the greater length, the distal tip of a teat in the axially extending opening of the teat chamber is positioned in a space relationship from the distal end of the teat chamber.

A transition chamber, having an axially extending reducing inner passageway, has an inlet contiguous to and communicating with the opening in the distal end. The inner passageway inlet has a dimension substantially equal to the opening and decreases in dimension to an outlet having an outlet dimension which is less than the inlet dimension. The transition chamber has an exterior surface space from the inner passageway with sufficient thickness to define on the exterior surface a circumferentially extending cup member configured to be passed through a central aperture in the shell and to then surround and urge the cuff member against a shell enabling a transition chamber to be supported within a central aperture.

A milk tube having a generally cylindrical passageway has a selected dimension which extends from a receiving end to a discharge end. The receiving end communicates with the outlet of the transition chamber. The discharge end is configured to be operatively connected to and having a selected dimension substantially equal to the outer diameter of an inlet of a milk claw.

Therefore, it is an advantage of the present invention to provide a replaceable liner for use with a teat cup having a rigid hollow shell with a central aperture formed at one end thereof and wherein the teat cup shell has an axial length to accommodate a liner wherein the teat cup chamber terminates in a distal end having an axial length which is greater in length than the length of a cow's teat terminating in a distal tip to be inserted into the teat chamber.

Another advantage to the present invention is that the flexible liner having a longer teat chamber achieves an improved a more complete massage of the distal tip of a teat.

Another advantage of the present invention is that the selected diameter of the milk tube generally cylindrical passageway due to an increased cross-sectional area results in reduced cyclic fluctuations of the milking vacuum due to the milk flow passage occluding the milk tube passageway.

Another advantage of the present inventions is that the teat cup shell includes a mouthpiece opening support in the form of a circumferential annular collar formed on the mouthpiece opening, which, in the preferred embodiment, is in the form of an outside rolled edge. The circumferential annular collar cooperates with a circumferential extending collar receiving member configured in the mouthpiece of the liner to add structural support to the mouthpiece of the liner to reduce distortion to the sealing relationship between the cow's teat and the mouthpiece opening.

Another advantage of the invention is that a method for installing a flexible liner into a teat cup shell is also disclosed and taught by this invention.

BRIEF DESCRIPTION OF THE DRAWING

The present invention will become more fully understood from the following detailed description of a preferred but non limiting embodiment thereof, described in connection with the accompanying drawings, wherein:

FIG. 7 is a top plan view of an assembled teat cup shell and replaceable liner of FIG. 4;

DETAILED DESCRIPTION OF THE INVENTION

Background

Typically, a milking machine includes four (4) teat cup assemblies which are attached to the teats located on an animal to be milked, such as for example, a modern dairy cow. Modern dairy cows produce higher milk flows which tend to cause a wider range of vacuum fluctuations due to the higher milk flow rates occluding the milk tube, outlet from the milk claw, milk liner and pipeline to the milk collecting system. U.S. Pat. No. 5,896,827, the inventor which is the inventor of the present invention, teaches that a substantially stable continuous vacuum level can be obtained through a milk claw and milk hose by selecting a cross-sectional area to be in the range of a minimum cross-sectional area for maintaining, at all milk flow rates, a substantially uniform laminar flow of milk therethrough and for concurrently providing a stable continuous vacuum in a vacuum chamber between the laminar flow of milk and the interior sidewalls of the milk flow outlet.

When a cow enters a milking barn or milking parlor, such as a herring bone style milking parlor, and the milking machine is connected to the animal's body, the body starts to react in preparation for "letting down" of the animal's, e.g. cow's, milk. A natural process takes place wherein the animal produces within the animal's blood stream a chemical called "oxitosin". This chemical works its way down into the udder causing the ovili cells to contract. In essence, contraction of the ovili cells causes a squeezing effect to help push out, expel or withdraw the animal's milk. The period of time the animal produces this oxitosin is limited, and recent research suggests somewhere between 4 and 6 minutes on average.

The milking system using the teachings of this invention not only recognizes the importance of lactation cycles, but is able to milk the cow faster at a substantially stable continuous vacuum level. Faster milking of an animal allows all the milk to be extracted within the oxitosin production period and most importantly when the animal is willing to give milk production.

In a miling system, a source of vacuum is provided to the milking system by vacuum pump through a vacuum conduit to a vacuum manifold header and a vacuum regulator 32 which is operatively connected to the vacuum conduit to control the maximum vacuum that would be applied to the milking system. Typically, the vacuum level in a milking system is in the order of 12 inches of Hg (12" Hg).

The disclosure set forth in U.S. Pat. No. 5,896,827 is incorporated by reference herein as if set forth verbatim herei. The disclosures in U.S. Pat. No. 5,896,827 of the milking system and system components are applicable to the present invention. A combiantion of the invention disclosed in U.S. Pat. No. 5,896,827 and the present invention results in a milking system that reduces trauma to a cow's teat and reduces infection and disease in a teat due to a number of causes including reduction of backflow of milk into a teat during the rest period.

The present invention is directed to providing of a teat cup assembly having a shell and replaceable liner which results in an improved handling of the increased milk flow rates from modern dairy cows while reducing trauma and disease to a cow's teat during the milking process and to facilitate maintaining of a substantially stable vacuum level between the teat cup assembly and the milk claw. The result is an improved milking system which accommodates a cow's teat which elongates during a milking operation while concurrently enabling better milk flow during the milk letdown phase and reducing milk backflow thereby reducing trauma and disease to the cow's teat.

During the milking process, when a cow's teach is stimulated the blood flow into the teat results in the cow's teat elongating approximately 150°. In the prior art liners used with the known prior art teat cup shells, the distal tip of the teat is generally located in the transition area where the liner is typically thicker to accommodate the transition from the diameter of the teat chamber to the inlet diameter of the milk tube.

A pulsator is a device that intermittently draws air from within the shell (outside the liner) of the liner or inflation and creates a vacuum to "pull" to "open" the liner or inflation away from or releasing the teat of the cow making the teat open so that the vacuum from the milk claw draws milk down thorough the teat. This is referred to as a "milk period". Alternatively, atmospheric pressure is applied by the pulsator to the liner or inflation to "push" or "close" the liner or inflation against the teat of the cow closing off the teat. This is referred to as a "rest period". The pulsator periodically draws air out of the liner or inflation to create a cycle of opening and closing of the liner or inflation This creates a situation of milking (teat under vacuum) and rest (teat not under vacuum).

During the milking process, cyclic fluctuations of the teat caused by the liner movement (due to the alternate application of atmospheric pressure and vacuum to the shell) in response to pulsation from a pulsator results in the thicker portion of the sidewalls responding to the pulsation forces by resisting the collapsing of the teat chamber in the area enclosing the distal tip of a cow's teat. In essence, the distal end of the teat chamber in the prior art liner are not long enough to cause an adequate collapse of the liner in the vicinity of and below the distal tip of a cow's teat in response to the pulsation forces.

Since a cow's teat elongates approximately 150% of normal when a vacuum is applied thereto, the distal tip of the cow's teat is subject to a differential pressure which is undesirable for the reasons described above. As a result, the length of the teat chamber generally must be not less than about 5 inches in length to accommodate for the elongated teat. In a typical milking system, the total length of the liner must be between about 11 inches to about 13 inches. Thus, by increasing the axial length of the teat chamber to be in the order of about 5 inches, only about 6 inches to about 8 inches remains to accommodate the transition between the teat chamber and milk tube.

Thus, the liner of the present invention is structured to minimize the transition area, referred herein as the transition chamber, between the teat chamber and milk tube. In addition, the diameter of the milk tube was increased as much as possible, in the range of about 1.7 times the diameter of the inlet to the milk claw, so as to provide to the extent possible a substantially uniform laminar flow of milk to the milk tube and for concurrently providing a stable continuous vacuum in a vacuum channel between the laminar flow of milk and the interior sidewalls of the milk tube passageway.

In describing the invention below with respect to the various figures, common elements illustrated in each of the figures are identified with the same numerals.

Assembled Teat Cup Shell and Flexible Liner

Figure 1:
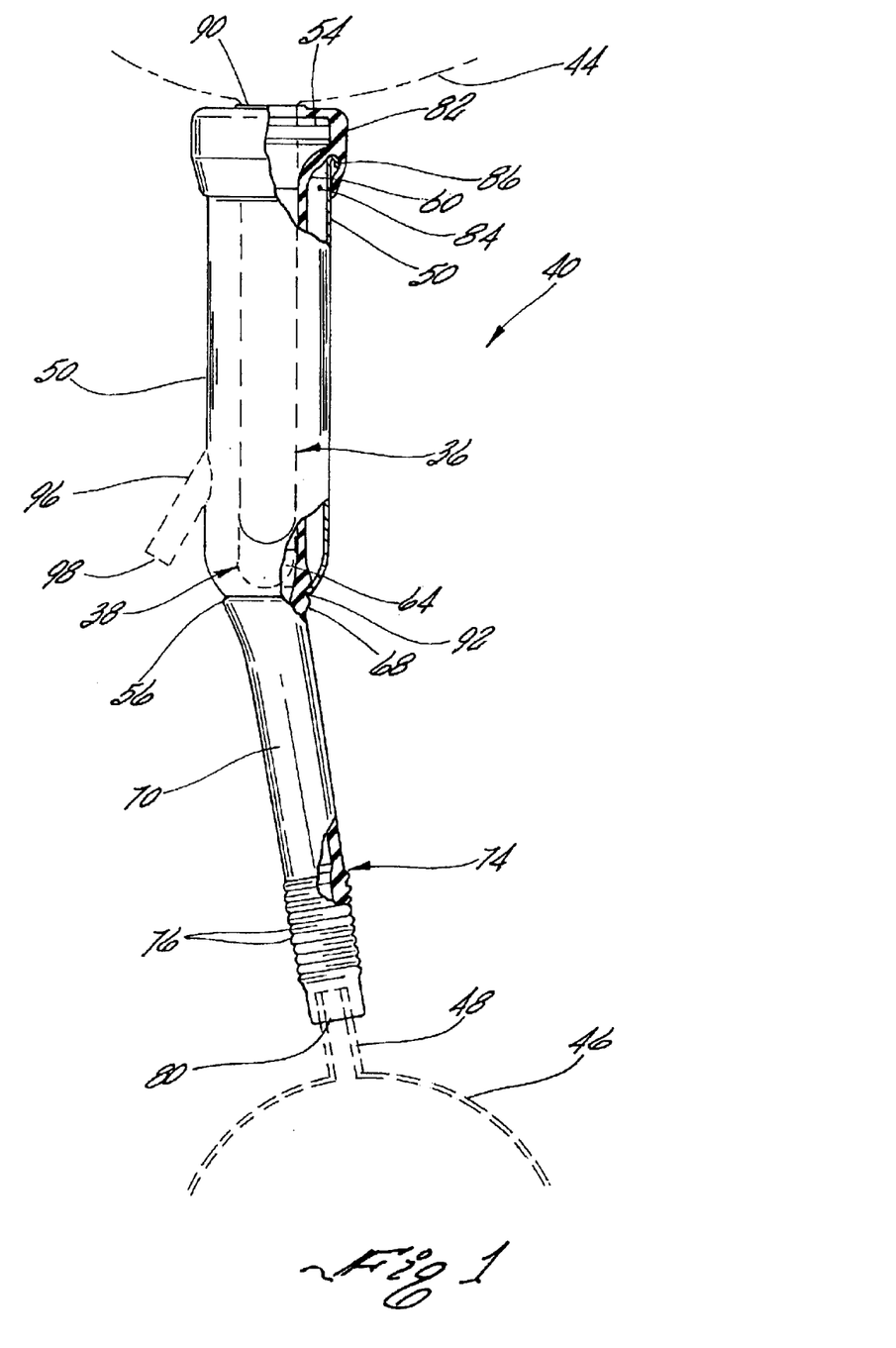
FIG. 1 is a pictorial representation of a teat cup assembly, partially in cross-section, operatively attached to a teat of a cow and to the inlet of a milk claw using the teaching of the present invention and wherein the "dashed" line represents the location of a distal tip of a teat in the teat chamber spaced from the distal end of the teat chamber and the "dotted" line represents the typical position of the distal tip of a teat in a prior art tubular liner.
Figures 1, 4, 5, 6, 8:
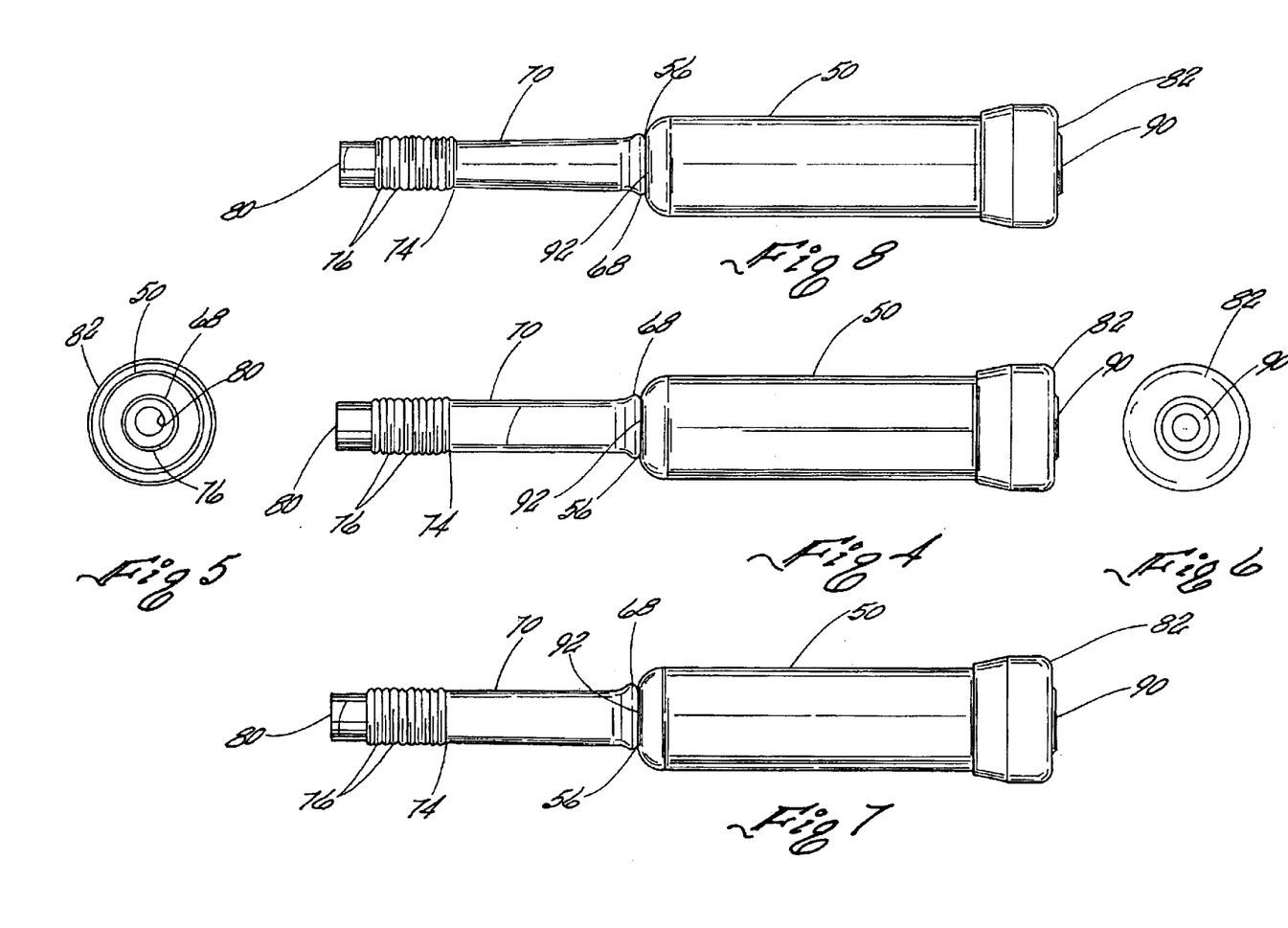
FIG. 4 is a front elevational view of an assembled teat cup shell and replaceable liner of FIG. 2.
FIG. 5 is a left side elevational view of an assembled teat cup shell and replaceable liner of FIG. 4.
FIG. 6 is a right side elevational view of an assembled teat cup shell and replaceable liner of FIG. 4.
FIG. 8 is a bottom plan view of an assembled teat cup shell and replaceable liner of FIG. 4.
Figures 2, 3:
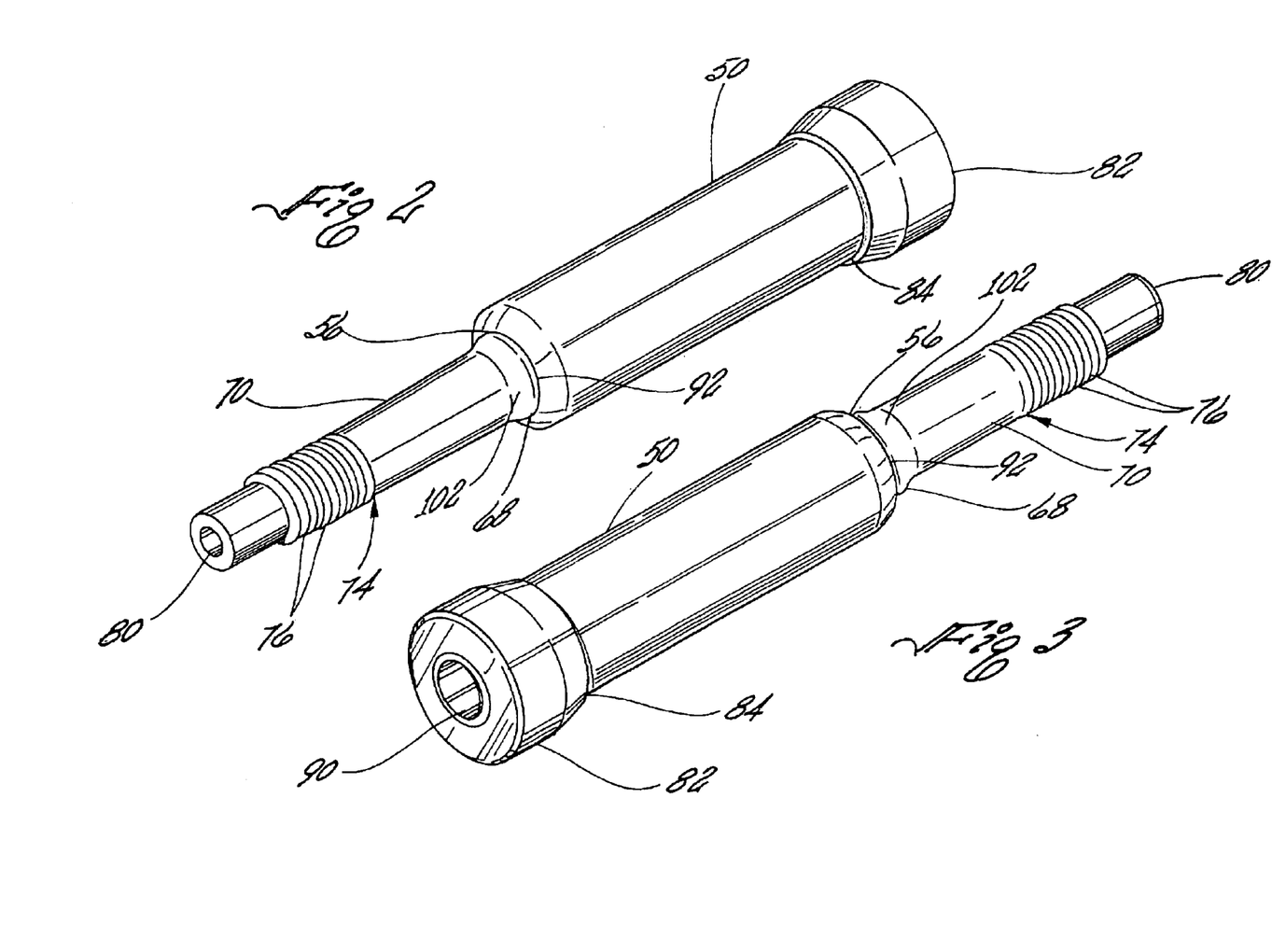
FIG. 2 is a top, front and left side perspective view of an assembled teat cup shell and replaceable liner.
FIG. 3 is a bottom, rear and right side perspective view of an assembled teat cup shell and replaceable liner of FIG. 2.
Figures 9, 10:
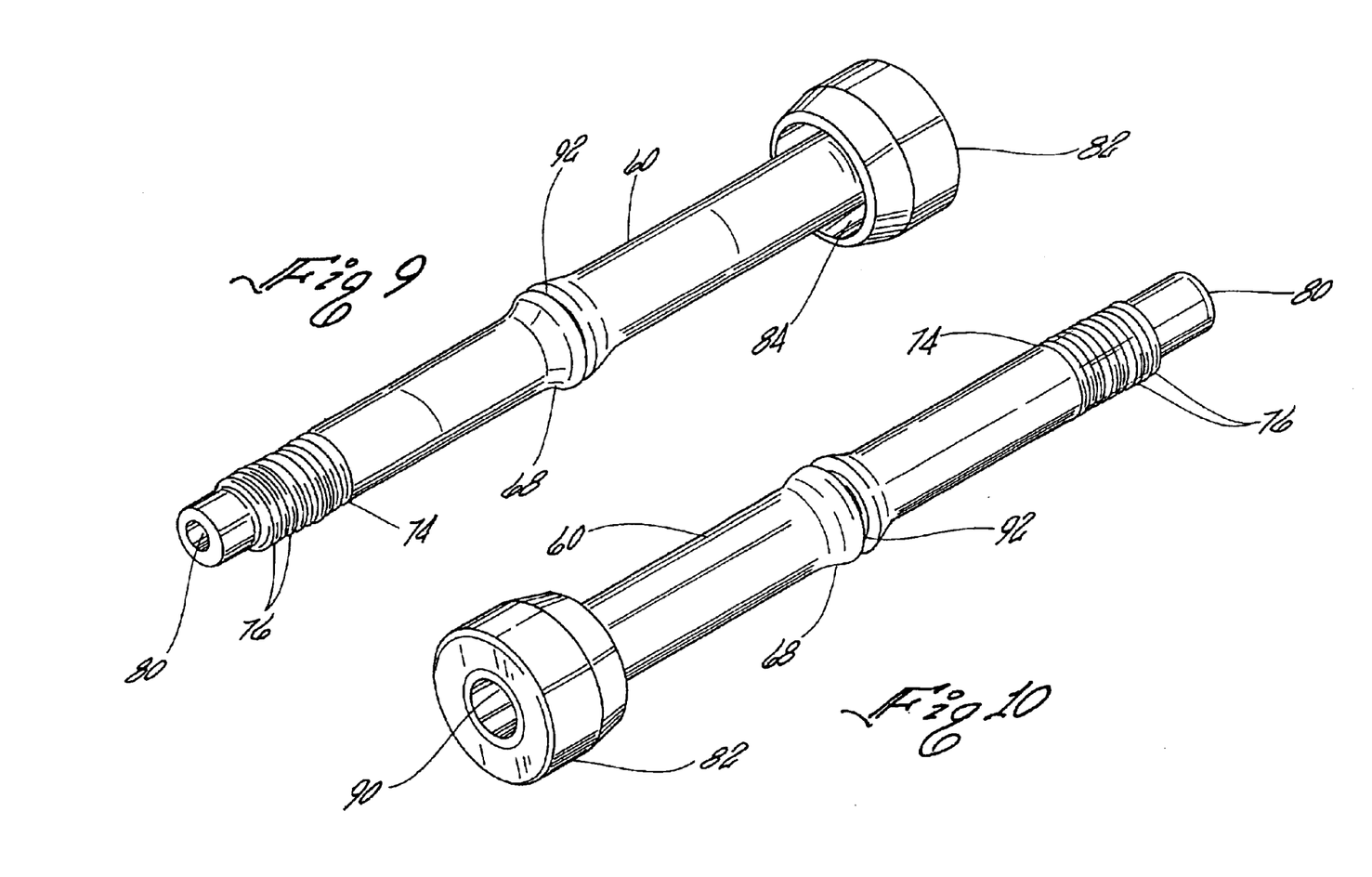
FIG. 9 is a top, front and left side perspective view of a replaceable liner used in an assembled teat cup shell and replaceable liner.
FIG. 10 is a bottom, rear and right side perspective view of a replaceable liner of FIG. 9.
Figures 11, 12, 13, 14, 15:
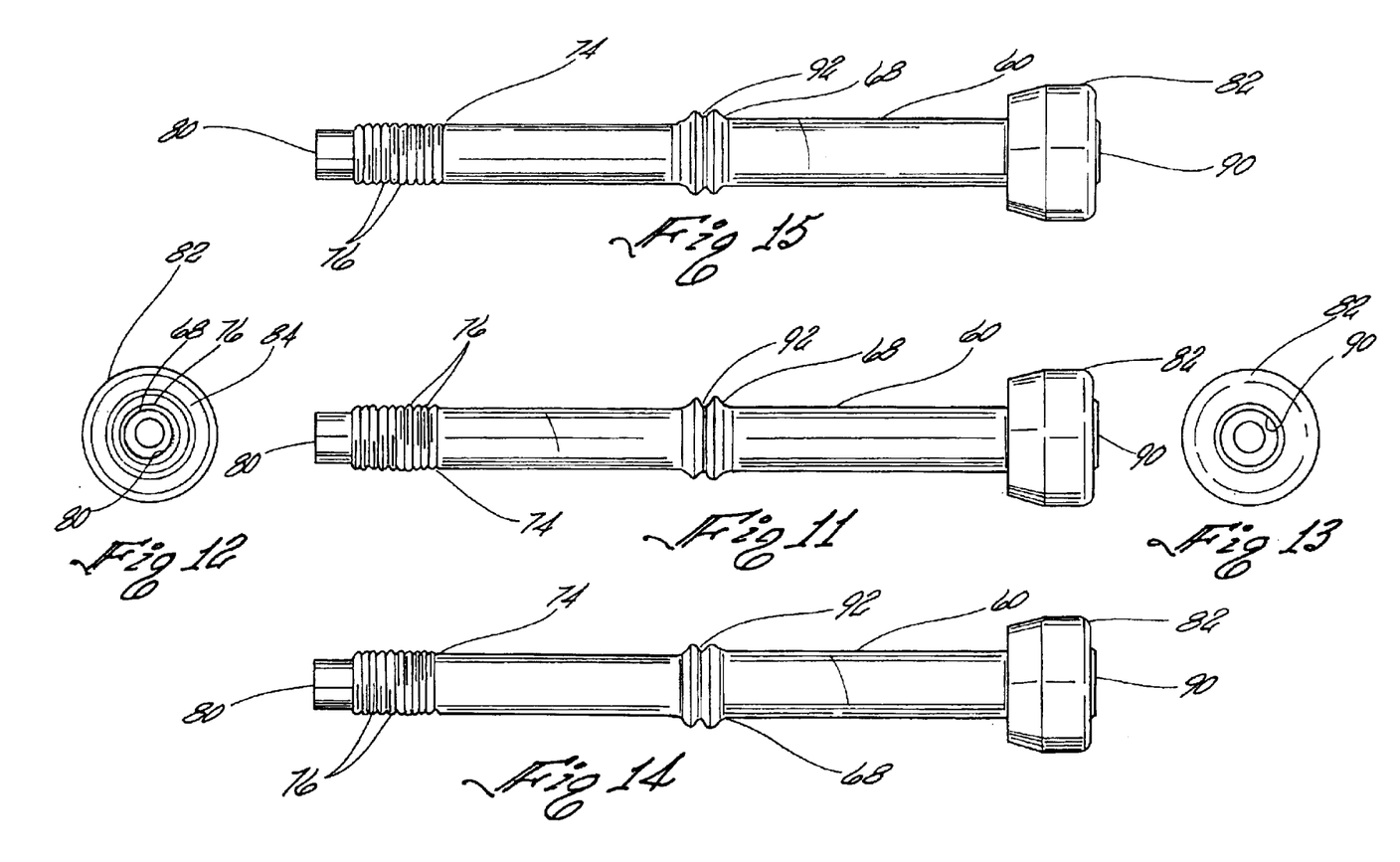
FIG. 11 is a front elevational view of a replaceable liner of FIG. 9.
FIG. 12 is a left side elevational view of a replaceable liner of FIG. 11.
FIG. 13 is a right side elevational view of a replaceable liner of FIG. 11.
FIG. 14 is a top plan view of a replaceable liner of FIG. 11.
FIG. 15 is a bottom plan view of a replaceable liner of FIG. 11.
Figures 16, 17, 22:
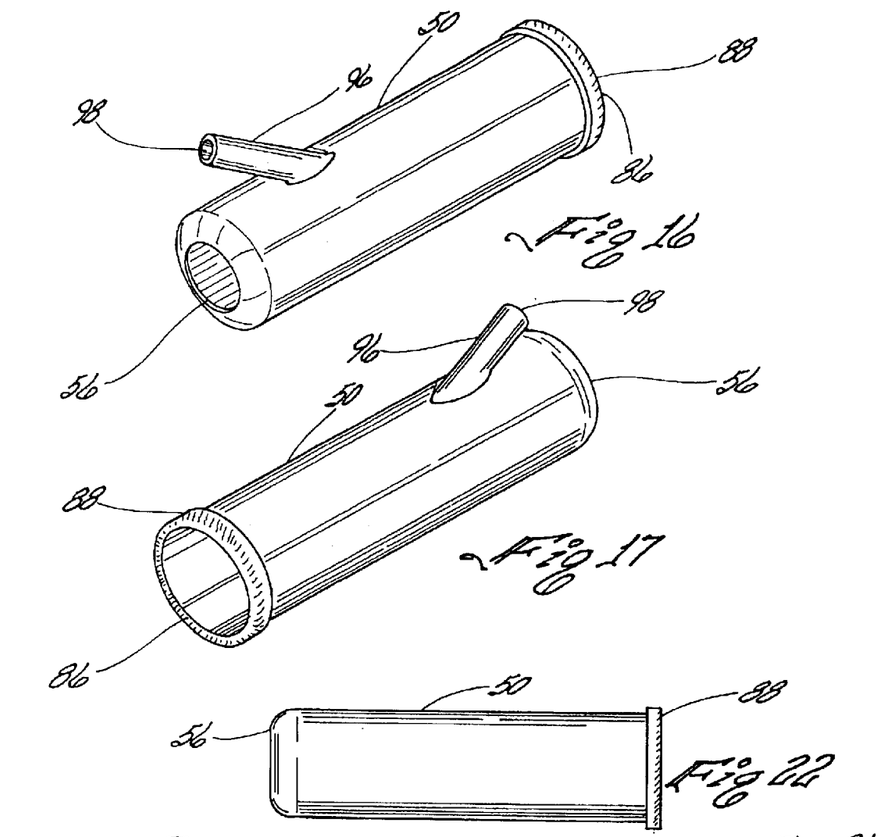
FIG. 16 is a top, front and left side perspective view of a teat cup shell used in an assembled teat cup shell and replaceable liner.
FIG. 17 is a bottom, rear and right side perspective view of a teat cup shell of FIG. 16.
FIG. 22 is a bottom plan view of a teat cup shell of FIG. 18.
Figures 18, 19, 20, 21:
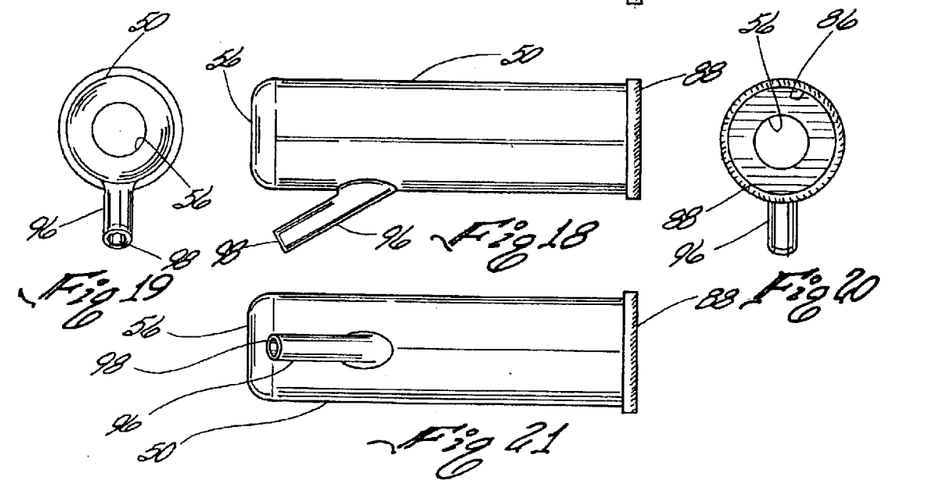
FIG. 18 is a front elevational view of a teat cup shell of FIG. 16.
FIG. 19 is a left side elevational view of a teat cup shell of FIG. 18.
FIG. 20 is a right side elevational view of a teat cup shell of FIG. 18.
FIG. 21 is a top plan view of a teat cup shell of FIG. 18.

FIG. 1 is a pictorial representation of a teat cup assembly 40, partially in cross-section, operatively attached to a teat of a cow located on an udder 44. The teat cup assembly 40 is operatively connect to a milk claw 46.

Figure 23:
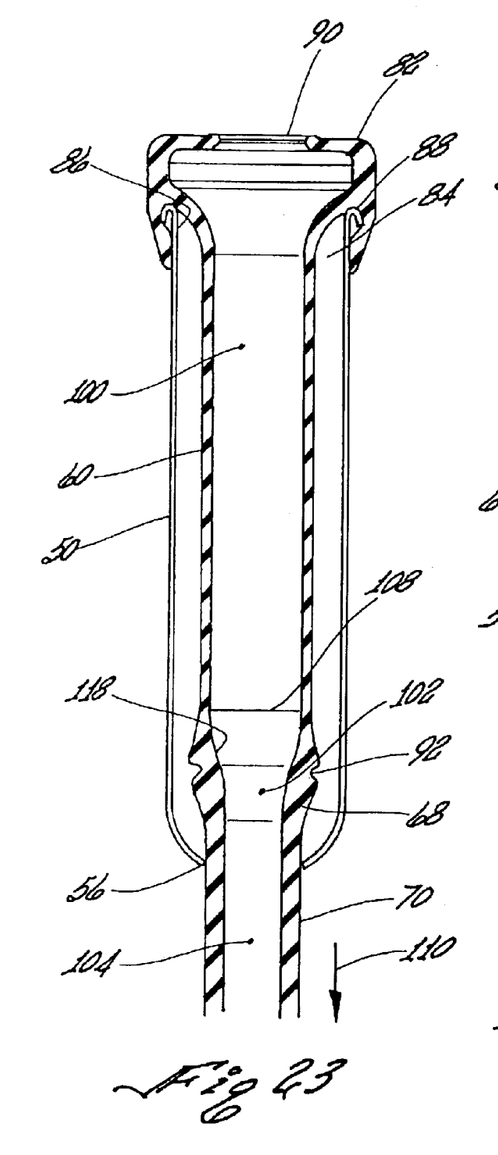
FIG. 23 is a partial front elevation view in cross-section showing the inserting of a liner into and through the mouth piece opening and central aperture of a teat cup shell.
Figure 24:
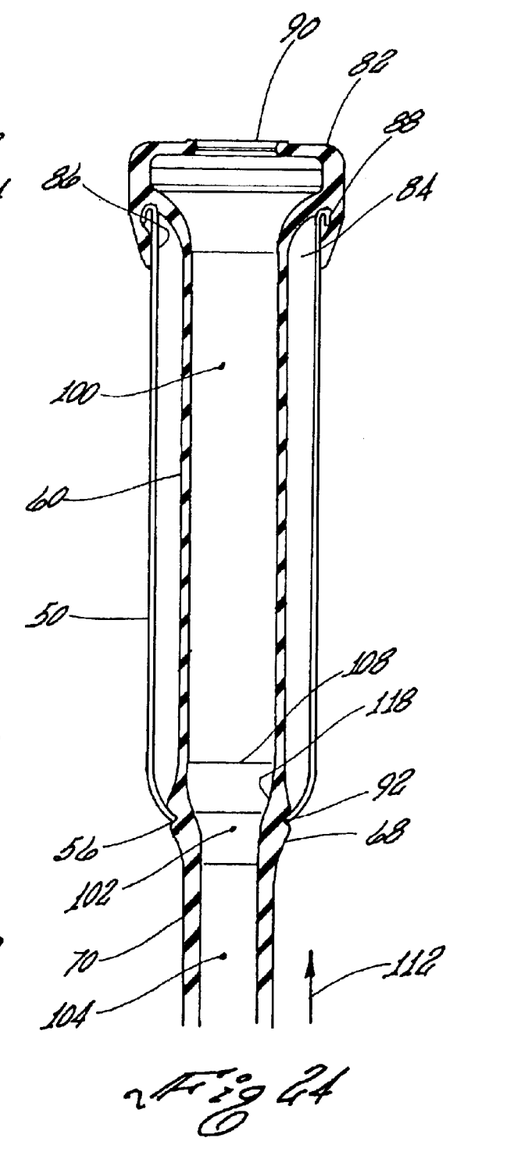
FIG. 24 is a partial front elevational view in cross-section showing the application of a pulling force onto the liner to pass the transition chamber through the central aperture and to position the annular shaped cuff member to receive the outer edge forming the central aperture wherein the annular shaped cuff member surrounds and is urged against the shell.

In FIG. 1, a teat cup shell 50 includes a rigid hollow member having a mouth piece opening 88 at one end thereof and a central aperture 56 at the other end thereof. The rigid hollow member forming the shell 50 has an axial length which is configured to receive a liner 60 having a teat chamber 100, as shown in FIGS. 23, 24, having an opening extending axially therethrough. The teat chamber 100 terminates in a distal end 108 having an axial length which is greater in length than a length of a teat terminating in a distal tip 106 in FIG. 25, to be inserted into the teat chamber 100. The distal tip 106 of an elongated teat, which has increased to approximately 150% of its normal length, is shown by dashed line 98 in FIG. 25. The distal tip 106 is positioned in the the extending opening of the teat chamber 100 and in a spaced relationship from the distal end 108 of the teat chamber 100.

A liner 60 is positioned within said shell 50. The liner 50 comprises the teat chamber 100 having an opening extending axially therethrough and terminates in a distal end 108. The teat chamber 100 has an axial length which is greater in length than a length of a teat 98 terminating in a distal tip 106. Thus a teat 98 inserted into the teat chamber 100 is positioned in a spaced relationship from the distal end 108 of the teat chamber 100 so that the distal end 106 is enclosed by the thin walls of the chamber as depicted in greter detail in FIG. 25 and away from the transiton chamber 102 depicted in FIGS. 23 throught 25.

The transition chamber 102 has an axially extending reducing inner passageway 118, shown in FIGS. 23 and 24, which has an inlet contiguous to and communicating with the opening in the distal end 108. The inner passageway 118 inlet has a dimension substantially equal to the opening and decreases in dimension to an outlet having an outlet dimension less than the inlet dimension. The transition chamber 102 has an exterior surface spaced from the inner passageway 118 with sufficient thickness to define on said exterior surface a circumferentially extending cuff member 68 adapted to be located in the central aperture 56. When the liner is installed in the shell as shown in FIG. 1, the cuff member 68 surrounds and urges the cuff member 68 against the shell enabling the transition chamber 102 to be supported within the central aperture 56.

Figure 29:
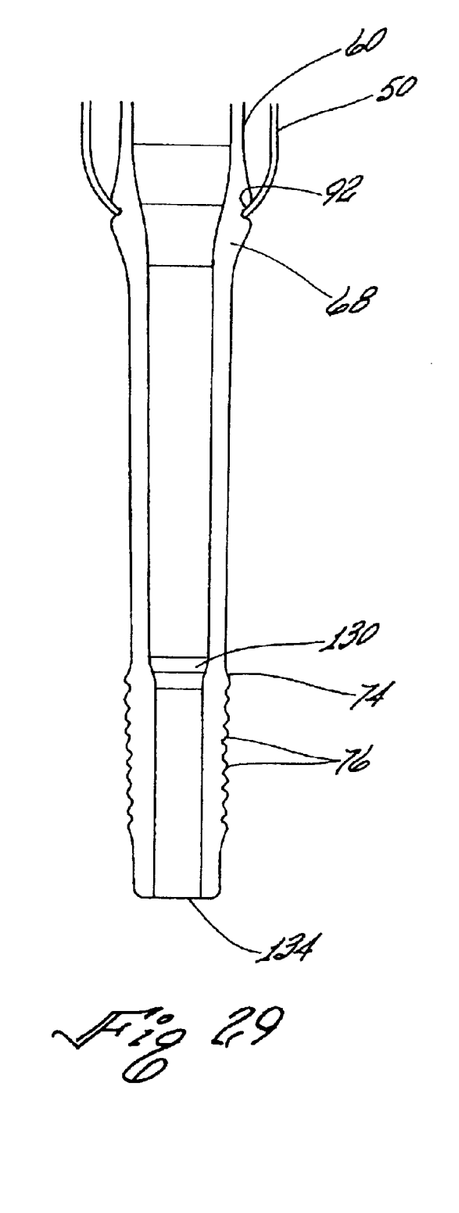
FIG. 29 is a partial front elevational view partially in cross sectional shown as assembled teat cup assembly and that the outlet of the mouth tube is substantially equal to the inlet dimension of a annular claw and that the inlet opening to the mouth tube has a dimension greater than the dimension of the outlet opening to apply the milking vacuum to the interior of the teat chamber

A milk tube 70 having a generally cylindrical, diameter passageway 104, shown in FIGS. 23 and 24, has a selected dimension which extends from a receiving end 130 to a discharge end 134 as shown in FIG. 29. The receiving end 130 communicates with the outlet of the transition chamber 102. The discharge end is configured to be operatively connected to and having a selected dimension substantially equal to the diameter of an inlet 48 of a milk claw 46.

In FIG. 1, the "dashed" line 36 represents the location of a distal tip of an elongated teat in the teat chamber 100 spaced from the distal end 108 the "dotted" line 38 represents the typical location of the distal tip in the known prior art tublular. Placing the same in the transition area and subject the same to a differential milking force as described above.

FIGS. 2 through 8 show an assembled teat cup shell 50 and replaceable liner 60 wherein the a circumferentially extending cuff member 68 is in the form of an circumferential annular ridge having a groove 92 formed therein for receiving an outer edge 88 of a shell defining the central aperture 56. The transistion chamber 102 and the milk tube 70 having an outlet or discharge end 80 is also shown.

The liner 50 includes a mouth piece 82 having a mouth piece opening 90 formed therin for receiving and passing a teat. The mouth piece includes a circumferentially extending collar receiving member 84 configured to enclose and be rigidly supported by an circumferential annular collar 92, shown in FIG. 1, formed on an end of a shell 50 opposite to the end having the central aperture 56.

FIGS. 9 through 15 show varies views of a replaceable liner 50 used in an assembled teat cup shell 50 and liner 60 as shown in FIG. 1.

In FIGS. 9 through 15, the liner 50 has a circumferentially extending cuff member 68 in the form of an circumferential annular ridge having a groove 92 formed therein for receiving an outer edge of a shell defining the central aperture 56. The transistion chamber 102 and the milk tube 74 having an outlet or discharge end 80 is also shown. The milk tube 74 has an exterior surface and the discharge end of the milk tube includes a plurality of axially spaced, circumferentially extending grooves 76 in the milk tube 74 exterior surface. The axially spaced, circumferentially extending grooves 76 extend along the length of the portion of the milk tube to be operatively connected to an inlet 48 of a milk claw.

FIGS. 16 through 22 show a teat cup 50 used in an assembled teat cup shell and replaceable liner shown in FIG. 1. The mouth piece opening 88 is in the form of an outer roller edged defining a circumferential annular collar 88 formed on an end of the shell 50 having the mouth piece opening which is located on the end opposite to the end having the central aperture 46 and serrated members are located on the shaped edge structure to increase the frictional holding force between the circumferential annular collar 88 and the underside of the circumferential annular collar receiving opening 84 in the mouth piece 82.

The outer edge forming the central aperture 56 cooperates with the circumferential annular cuff member to support the tube 50 within the shell 60. The annular cuff member may be a shoulder shaped member, such as a shoulder 120 shown in FIG. 30, or a circumferentially extending cuff member in the form of an circumferential annular ridge 68 having a groove 92 formed therein for receiving an outer edge of a shell defining a central aperture 42 as shown in FIG. 29.

The inlet 96 having an opening 98 is use to operatively connect the teat cup assembly 40, shown in FIG. 1, through a pulsator line to a pulsator controller for selectivley applying a milking vacuum and atmospheric pressure to the cavity formed between shell 50 and the tube 50 to fluctutate or collapse the liner to produce the milking force by massaging the teats, all as is well known in the art.

The partial front elevational view in cross-section of FIG. 23 shows the inserting of a liner 60 into and through the mouth piece opening 86 and central aperture of a teat cup shell 50.

The partial front elevational view in cross-section of FIG. 24 showes the application of a pulling force onto the liner 50 to pass the transition chamber 102 through the central aperture to position the annular shaped cuff member 68 to receive the outer edge defining the central aperture wherein the annular shaped cuff member surrounds and is urged against the shell 50.

FIGS. 23 and 24, in combination with the other figures, depict a method of inserting a liner 60 into a teat cup shell 50 comprising the steps of: (i) inserting through a mouth piece opening 88 located at one end of a teat cup 50 having a rigid hollow shell and through a central aperture 56 formed at the other end thereof, a discharge end 80 of a milk tube 74 of liner 50 wherein said liner 50 comprises a teat chamber 100 having an opening extending axially therethrough and which terminates in a distal end 108 having an axial length which is greater in length than a length of a teat terminating in a distal tip 108 to be inserted into the teat chamber 100 positioning a distal tip 106 of a teat 94 in the axially extending opening in a spaced relationship from the distal end 108 of the teat chamber 100, a transition chamber 104 having an axially extending reducing inner passageway 118 which has an inlet contiguous to and communicating with the opening in the distal end 108 wherein said inner passageway inlet has a dimension substantially equal to the opening and decreasing in dimension to an outlet having an outlet dimension less that the inlet dimension and wherein the transition chamber has an exterior surface spaced from the inner passageway 118 with sufficient thickness to define on the exterior surface a circumferentially extending cuff member 68 configured to be passed through a central aperture 56 in the shell 50 in and then to surround and urge the cuff member 68 against the shell 50 enabling the transition chamber 104 to be supported within the central aperture 56 and wherein said milk tube 74 has a generally cylindrical passageway having a selected dimension which extends from a receiving end to a discharge end 80 and wherein said receiving end communicates with the outlet of said transition chamber 104 and the discharge end 80 is configured to be operatively connected to and having a selected dimension substantially equal to the diameter of an inlet 48 to a milk claw 46; and (ii) applying a sufficient axial pulling force as shown by arrow 110 onto said milk tube 74 of the liner 60 to elongate the liner 50 to a length sufficient to pass the circumferentially extending cuff member 68 through th central aperture 56 and then relaxing the pulling force as shown by arrow 112 to surround and urge the cuff member 68 in compression against the shell 50 enabling the transition chamber 104 to be supported within the central aperture 56.

The step of inserting may include inserting a liner 60 having formed on an end opposite to the distal end 108 a mouth piece 82 having a generally circular opening 90 for receiving a teat 94.

The step of inserting may include inserting a liner 60 may include a shell 50 having a circumferential annular collar 88 formed on an end of the shell having the mouth piece opening 86 and wherein the liner 50 includes a circumferentially extending collar receiving member 82 configured to enclose and be rigidly supported by said circumferential annular collar 88.

Figures 25, 26, 27:
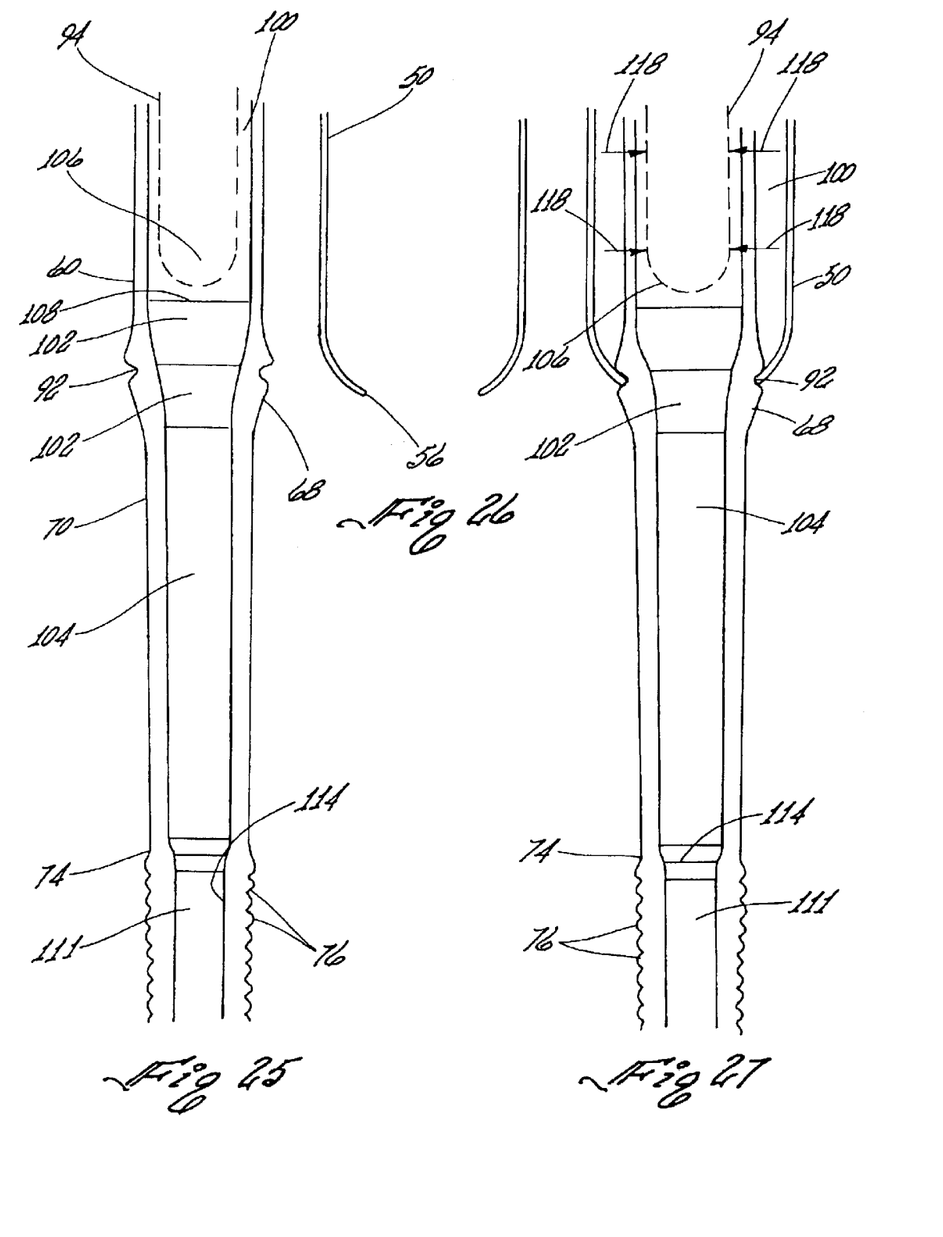
FIG. 25 is a partial front elevational view in partial cross-section showing the relationship between the distal end of the teat chamber and structure of the transistion chamber communicating with the milk tube and the location of the annular shaped cuff member on the exterior surface of the transition chamber.
FIG. 26 is a partial front elevation view partially in cross-section of the shell showing the outer edge defining to central operations in the shell.
FIG. 27 is a partial front elevation view partially in cross section of an assembled shell and liner with the annular shaped cuff member support the transition chamber in the central aperture.

In FIG. 25, the partial front elevational view in partial cross-section shows the relationship between the distal end 108 of the teat chamber 100 and the generally cylindrical passageway 104, which in the preferred embodiment shown in FIGS. 25 and 27 is reducing in diameter. The generally cylindrical passageway 104 extends to an inlet opening 114 to a milk tube inlet passageway 116 located in a milk tube inlet attachment section 74. The inlet opening 104 and passageway 104 have a selected diameter which extends to the discharge end or opening 80. The selected diameter is at least equal to the diameer of the inlet 48 of the milk claw 46.

FIG. 25 also shows the location of the annular shaped cuff member 68 on the exterior surface of the transition chamber 104 which, in the embodiment illustrated in FIGS. 25 and 27, is in the form of a circumferential annular ridge having a groove 92 formed therein for receiving an outer edge of a shell 50 defining a central aperture 56.

FIG. 26, which is a partial front elevation view partially in cross-section of the shell 50, illustrates an outer edge 56 defining to central aperture in the shell 50. The outer edge forming the central aperture 56 cooperates with the circumferential annular cuff member 68 to support the tube 50 within the shell 60. The annular cuff member 68 my be a shoulder shaped member, such as a shoulder 120 shown in FIG. 30, or a circumferentially extending cuff member in the form of an circumferential annular ridge 68 having a groove 92 formed therein for receiving an outer edge of a shell defining a central aperture 56 as shown in FIG. 29.

FIG. 27 is a partial front elevation view partially in cross section of an assembled shell 50 and liner 60 with the annular shaped cuff member 68 supporting the transition chamber 102 in the central aperture 56 after the liner is installed using the method depicted by FIGS. 23 and 34 as described above. The cuff member may be formed into other shapes. The advantage of using the circumferential annular ridge 68 having a groove 92 as illustrated in FIG. 27 is that a double seal is formed, one on each side of the shell 50 defining the central aperture 56, which tends to hold the liner securely in place in the shell and protects the liner 60 from bending forces applied to the test cup assembly 40.

Figure 28:
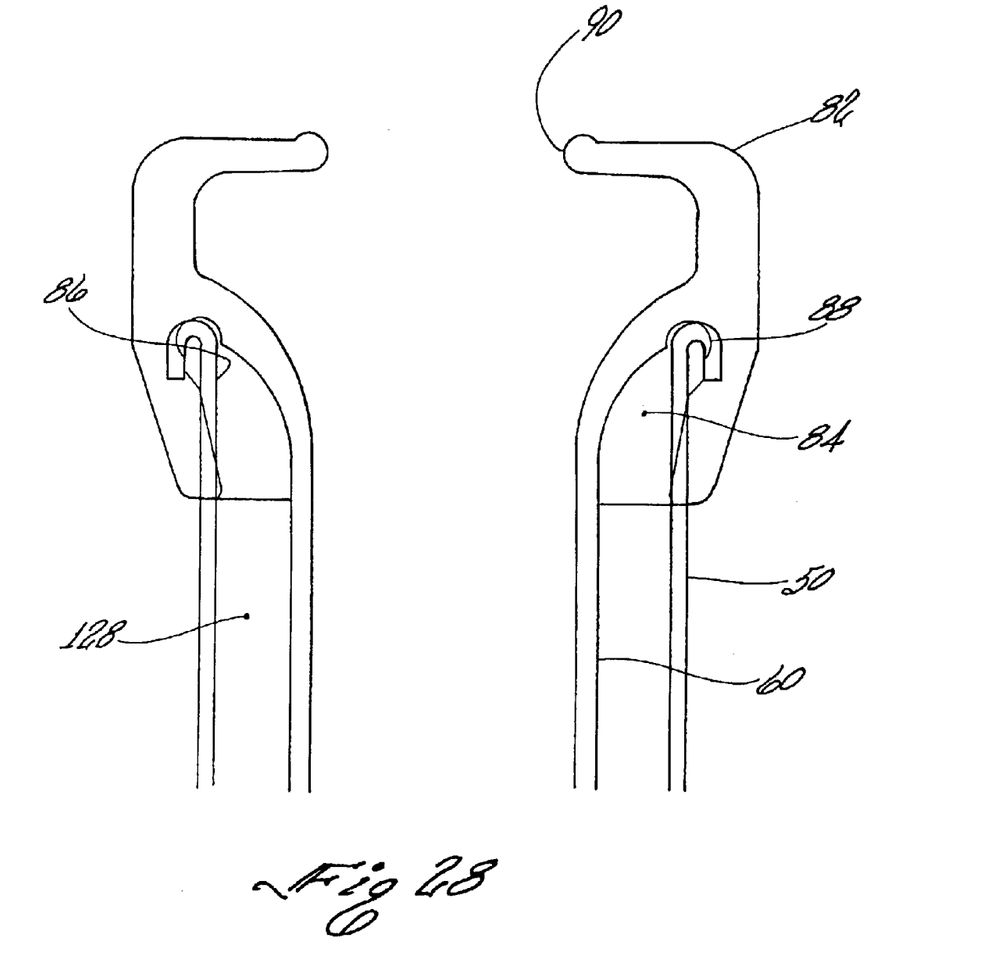
FIG. 28 is a pictorial representation of a mouth piece in a liner showing a generally circular opening for receiving a teat, a shell having a circumferentially annular collar formed on the end of the shell having a mouth piece opening as wherein the liner has a circumferentially extending collar receiving member which is enclosed by and structurally supported by the circumferential annular collar of the shell.

The pictorial representation of a mouth piece 82 in a liner 60, as shown in FIG. 28, is generally in the form of circular opening 90 for receiving a teat 94. A seal is formed between the sidewalls of the mouth piece 82 and the teat to maintain the vacuum in the teat chamber 100. The shell 50 has a circumferentially annular collar 88 formed on the end of the shell 50 having a mouth piece opening 86.

In order to insure that a seal is formed between the mouth piece 82 and the mouth piece opening 86 in the shell 50, the liner 50 has a circumferentially extending collar receiving member 84 which encloses and maintains a sealing relationship with the circumferentially annular collar 88 formed on the mouth piece opening 86 of the shell 50. This results in a chamber 128 being formed between the outer surface of the liner 50 and housing of the shell 60 to receive the pulsation pulses from the pulsator through the inlet 98.

In operation, a milking vacuum is applied to the discharge end 80 of the milk tube attachment section 74 and the vacuum is applied through the milk tube 70 and the transision chamber to the teat chamber 100. The vacuum enclosed the teat and is maintained in the teat chamber 100 by the vacuum seal formed between the mouth piece openong 90 and the outside surface of the teat.

When a vacuum is applied to the shell through pulsation inlet 98, the vacuum is applied to the chamber 128. Since the pressure on both the interior surface and exterior surfce of the thin walls of the teat chamber are balance, the liner remains in the open position as shown in FIG. 27.

When atmospheric pressure is applied to the shell 50 through pulsation inlet 98, atmospheric pressure is then applied to chamber 128 placing atmospheric pressure onto the exterior wall of the thin wall defining the teat chamber 100. The asmospheric pressure collapses the teat chamber 104 applying a uniform massaging or milking force on the teat including the distal tip of the teat as depicted by arrows 118 on FIG. 27 expelling milk therefrom.

Since the distal tip 106 of the teat 94 is positioned above tehtransition chamber 102, the thicker section 68 does not apply a differential force on the teat 94 since the length of the treatment chamber positions the distal tip 106 above and spaced from the distal end 108 of the teat chamber 108. The result is that a teat 94 is not subject to a differential pressure during milking which helps to reduce trauma to the teat during the milking process.

In FIG. 29, the preferred embodiment of the liner 50 wherein the circumferentially extending cuff member 68 is in the form of an circumferential annular ridge having a groove 92 formed therein for receiving an outer edge of a shell 50 defining a central aperture 56 and the milk tube attachment section 74 includes a plurality of axially spaced, circumferentially extending grooves in the milk tube exterior surface and extending along the length of the portion of the milk tube to be operatively connected to an inlet of a milk claw. This structure provides the ability of bending the milk tube, as necessary, to attach the teat cup assembly to a milk claw without significantly transmitting a bending force on the remaining portion of the liner 50. The the outlet 80 of the milk tube is substantially equal to the inlet dimension of a milk claw and that the inlet opening to the mouth tube has a dimension greater than the dimension of the outlet 80 opening to apply a substantially uniform laminar flow of milk therethrough and for concurrently providing a stable continuous vacuum in a vacuum chamber between the laminar flow of milk and the interior sidewalls of the milk passageway 104 in the milk tube 70.

Figure 30:
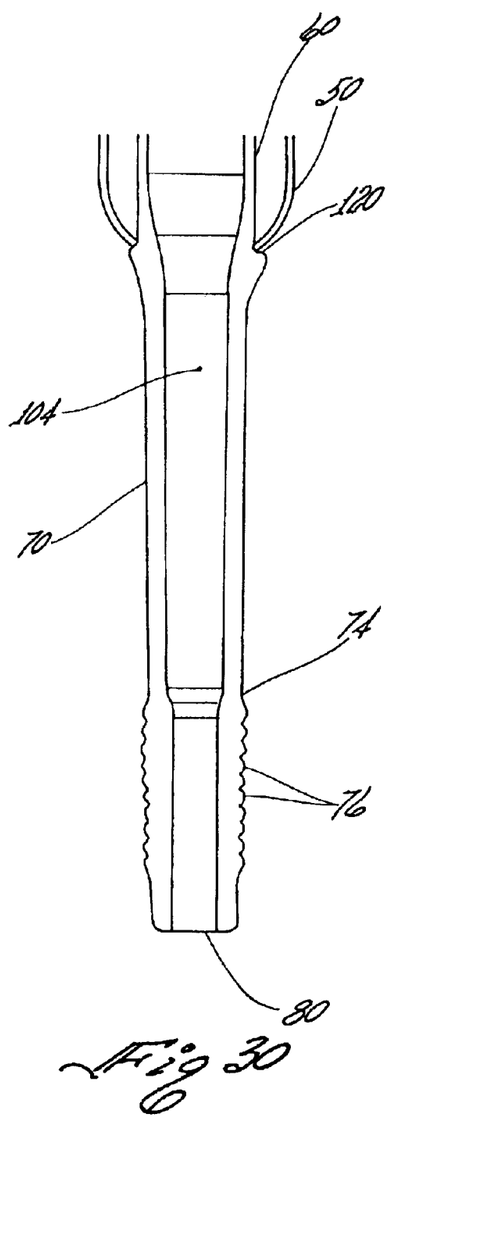
FIG. 30 is a partial frontal view in cross section illustrating an alternative embodiment wherein the transition chamber annular shaped cuff member defines a shoulder for receiving the outer edge of the shell defining the central opening and wherein the discharge end of the milk tube has a plurality of spaced annular shaped grooves.

FIG. 30 shows an alternative embodiment wherein the transition chamber circumferenatial annular shaped cuff member 68 defines a shoulder 120 for receiving the outer edge of the shell 50 defining the central opening 56 and wherein the discharge end of the milk tube has a plurality of spaced annular shaped grooves.

Figure 31:
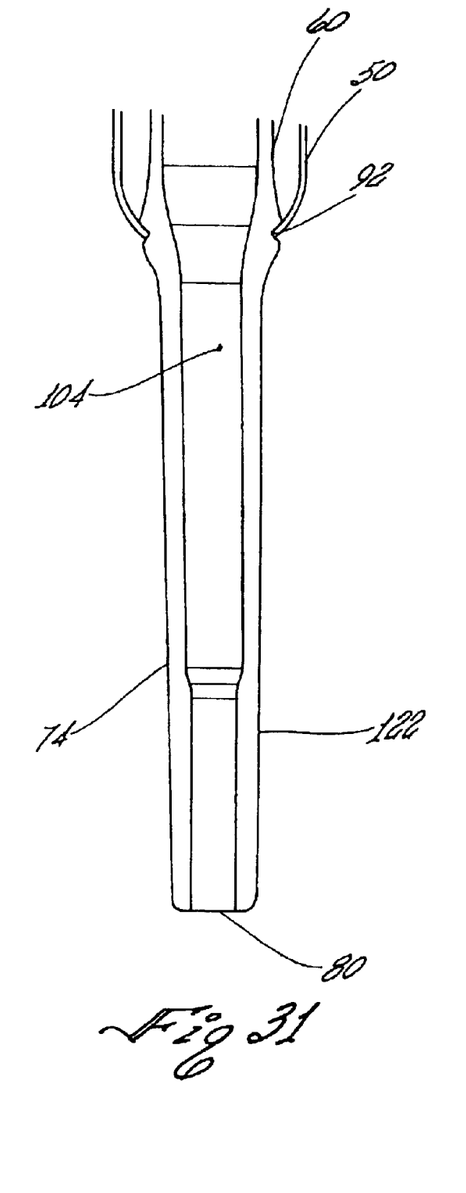
FIG. 31 is a partial frontal view in cross section illustrating yet another alternative embodiment wherein the transition chamber annular shaped cuff member is formed of an annular ring member having a groove for receiving the outer edge of the shell defining the central opening and wherein the discharge end of the milk tube has a smooth outer surface.

In FIG. 31 illustrates yet another alternative embodiment wherein the liner 50 has a circumferentially extending cuff member 68 which is in the form of an circumferential annular ridge having a groove 92 formed therein for receiving an outer edge of a shell 50 defining a central aperture 56 and the milk tube attachment section 74 of the milk tube has a smooth outer surface.

Figure 32:
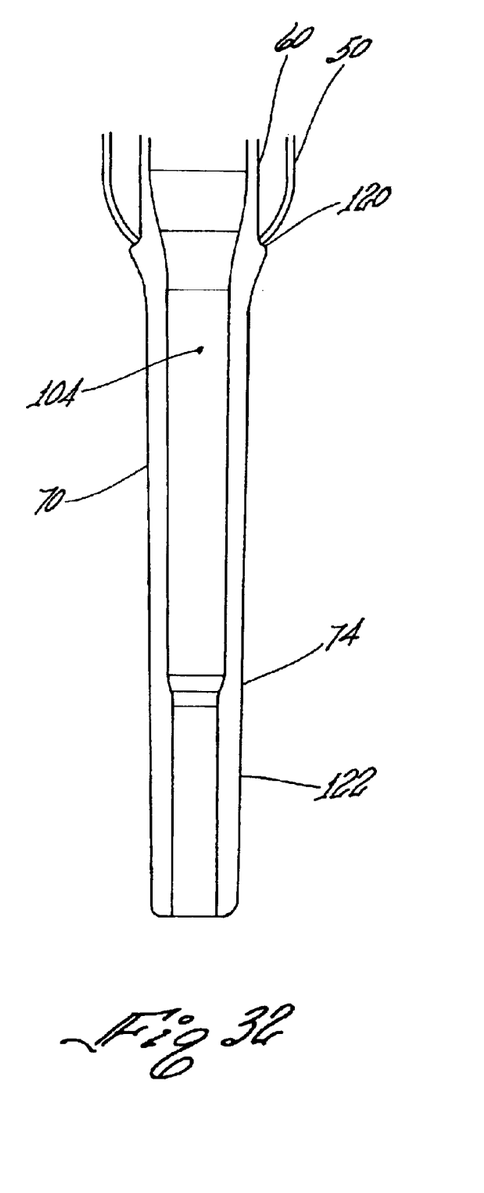
FIG. 32 is a partial frontal view in cross section illustrating still yet an alternative embodiment wherein the transition chamber annular shaped cuff member defines a shoulder for receiving the outer edge of the shell defining the central opening and wherein the discharge end of the milk tube has a smooth outer surface.

FIG. 32 is a partial frontal view in cross section illustrating still yet an alternative embodiment wherein the transition chamber annular shaped cuff member defines a shoulder for receiving the outer edge of the shell defining the central opening and wherein the discharge end of the milk tube has a smooth outer surface.

It is envisioned that the teat cup liner and teat cup shell forming a teat cup assembly can be used in the modern automated dairy milking barn in substantially the preferred embodiment or variation thereof. It will be appreciated that various alterations and modifications may be made to the teat cup liner and teat cup shell forming a teat cup assembly to enhance the functional characteristics thereof. All such variations and modifications should be considered to fall within the scope of the invention as broadly hereinbefore described and as claimed hereafter.

All such uses, variations, modifications and the like are anticipated to be within the scope of this invention.

All such uses, variations, modifications and the like are anticipated to be within the scope of this invention.

What is claimed is:

1. A liner for use with a teat cup having a rigid hollow shell with a central aperture formed at one end thereof, said liner comprising a teat chamber having an opening extending axially therethrough, said teat chamber terminating in a distal end and having an axial length which is greater in length than a length of a teat terminating in a distal tip to be inserted into the teat chamber positioning a distal tip of a teat in said axially extending opening in a spaced relationship from said distal end of the teat chamber, said liner including a circumferentially extending collar receiving member configured to enclose and be rigidly supported by an circumferential annular collar formed on an end of a shell opposite to the end having the central aperture wherein said circumferentially extending collar receiving member is configured to enclose and be rigidly supported by an circumferential annular collar having serrated members located on a shaped edge of a circumferential annular collar formed on an end of a shell opposite to the end having the central aperture;

a transition chamber having an axially extending reducing inner passageway which has an inlet contiguous to and communicating with said opening in the distal end, said inner passageway inlet having a dimension substantially equal to said opening and decreasing in dimension to an outlet having an outlet dimension less that the inlet dimension, said transition chamber having an exterior surface spaced from said inner passageway with sufficient thickness to define on said exterior surface a circumferentially extending cuff member configured to be passed through a central aperture in a shell and to then surround and urge the cuff member against a shell enabling the transition chamber to be supported within a central aperture; and a milk tube having a generally cylindrical, passageway having a selected dimension which extends from a receiving end to a discharge end, said receiving end communicating with said outlet of the transition chamber and said discharge end being configured to be operatively connected to and having a selected dimension substantially equal to the diameter of an inlet of a milk claw.

2. The liner of claim 1 wherein said teat chamber has formed on an end opposite to the distal end a mouth piece having a generally circular opening for receiving a teat.

3. The liner of claim 1 wherein said circumferentially extending cuff member is in the form of an circumferential annular ridge having a groove formed therein for receiving an outer edge of a shell defining a central aperture.

4. The liner of claim 1 wherein said milk tube has an exterior surface and wherein said discharge end of the milk tube includes a plurality of axially spaced, circumferentially extending grooves in the milk tube exterior surface and extending along the length of the portion of the milk tube to be operatively connected to an inlet of a milk claw.

5. The liner of claim 1 wherein said teat chamber, said transition chamber and said milk tube is a one-piece unit.

6. The liner of claim 5 wherein said teat chamber, said transition chamber and said milk tube having a plurality of axially spaced, circumferentially extending grooves is a one piece unit.

7. The liner of claim 5 wherein said liner is formed of a material selected from the group consisting of a flexible material, an elastomeric material, a synthetic composition material and a natural rubber material.

8. A teat cup shell comprising a rigid hollow member having a mouth piece opening at one end thereof and a central aperture at the other end said rigid hollow member having an axial length which is configured to receive a liner having a teat chamber having an opening extending axially therethrough and wherein a teat chamber terminates in a distal end having an axial length which is greater in length than a length of a teat terminating in a distal tip to be inserted into the teat chamber positioning a distal tip of a teat in said axially extending opening in a spaced relationship from a distal end of a teat chamber and wherein said mouth piece opening defines a circumferential annular collar having serrated members located on a shaped edge.

9. The teat cup shell of claim 8 wherein said shell central aperture is defined by an outer edge which is configured to receive a liner having a circumferentially extending cuff member in the form of an circumferential annular ridge having a groove formed therein.

10. In combination, a teat cup shell comprising a rigid hollow member having a mouth piece, opening at one end thereof and a central aperture at the other end, said rigid hollow member having an axial length which is configured to receive a liner having a teat chamber having an opening extending axially therethrough and wherein a teat chamber terminates in a distal end having an axial length which is greater in length than a length of a teat terminating in a distal tip to be inserted into the teat chamber positioning a distal tip of a teat in said axially extending opening in a spaced relationship from a distal end of a teat chamber, said mouth piece opening of the shell including a circumferential annular collar having serrated members located on a shaped edge;

a liner positioned within said shell wherein said liner comprises a teat chamber having an opening extending axially therethrough, said teat chamber terminating in a distal end having an axial length which is greater in length than a length of a teat terminating in a distal tip to be inserted into the teat chamber positioning a distal tip of a teat in said axially extending opening in a spaced relationship from said distal end of the teat chamber;

a circumferentially extending collar receiving member configured to enclose and be rigidly supported by said circumferential annular collar having said serrated members a transition chamber having an axially extending reducing inner passageway which has an inlet contiguous to and communicating with said opening in the distal end, said inner passageway inlet having a dimension substantially equal to said opening and decreasing in dimension to an outlet having an outlet dimension less that the inlet dimension, said transition chamber having an exterior surface spaced from said inner passageway with sufficient thickness to define on said exterior surface a circumferentially extending cuff member located in said central aperture and surrounding and urging the cuff member against the shell enabling the transition chamber to be supported within the central aperture; and a milk tube having a generally cylindrical, diameter passageway having a selected dimension which extends from a receiving end to a discharge end, said receiving end communicating with the outlet of said transition chamber and said discharge end being configured to be operatively connected to and having a selected dimension substantially equal to the diameter of an inlet of a milk claw.

11. The combination of claim 10 further wherein said teat chamber has formed on an end opposite to the distal end a mouth piece having a generally circular opening for receiving a teat.

12. The combination of claim 10 wherein said shell defines the central opening with an outer edge and said circumferentially extending cuff member is in the form of an circumferential annular ridge having a groove formed therein to receive said outer edge defining the central aperture.

13. The combination claim 10 wherein said milk tube of the liner has an exterior surface and wherein said discharge end of the milk tube includes a plurality of axially spaced, circumferentially extending grooves in the milk tube exterior surface and extending along the length of the portion of the milk tube to be operatively connected to an inlet of a milk claw.

14. The combination claim 10 wherein said teat chamber, said transition chamber and said milk tube is a one-piece unit.

15. The combination of claim 14 wherein said teat chamber, said transition chamber and said milk tube having a plurality of axially spaced, circumferentially extending grooves is a one piece unit.

16. The combination claim 15 wherein said liner is formed of a material selected from the group consisting of an flexible material, an elastomeric material, a synthetic composition material and a natural rubber material.

17. A method of inserting a liner into a teat cup shell comprising the steps of inserting through a mouth piece opening located at one end of a teat cup having a rigid hollow shell and through a central aperture formed at the other end thereof and wherein a circumferential annular collar is formed on an end of a shell opposite to the end having the central aperture and said circumferential annular collar has serrated members located on a shaped edge thereof, a liner including a circumferentially extending collar receiving member configured to enclose and be rigidly supported by an circumferential annular collar formed on an end of a shell opposite to the end having the central aperture wherein said circumferentially extending collar receiving member is configured to enclose and be rigidly supported by an circumferential annular collar having serrated members located on a shaped edge of a circumferential annular collar formed on an end of a shell opposite to the end having the central aperture wherein said liner comprises a teat chamber having an opening extending axially therethrough and which terminates in a distal end having an axial length which is greater in length than a length of a teat terminating in a distal tip to be inserted into the teat chamber positioning a distal tip of a teat in said axially extending opening in a spaced relationship from said distal end of the teat chamber, a transition chamber having an axially extending reducing inner passageway which has an inlet contiguous to and communicating with said opening in the distal end wherein said inner passageway inlet has a dimension substantially equal to said opening and decreasing in dimension to an outlet having an outlet dimension less that the inlet dimension and wherein said transition chamber has an exterior surface spaced from said inner passageway with sufficient thickness to define on said exterior surface a circumferentially extending cuff member configured to be passed through a central aperture in the shell and then to surround and urge the cuff member against the shell enabling the transition chamber to be supported within the central aperture and wherein a milk tube located at said outlet of the transition chamber has a generally cylindrical passageway having a selected dimension which extends from a receiving end to a discharge end and wherein said receiving end communicates with the outlet of said transition chamber and said discharge end being configured to be operatively connected to and having a selected dimension substantially equal to the diameter of an inlet a milk claw; and applying a sufficient axial pulling force onto said milk tube of the liner to elongate said liner to a length sufficient to pass said circumferentially extending cuff member through said central aperture and then relaxing the pulling force to surround and urge the cuff member in compression against the shell enabling the transition chamber to be supported within the central aperture.

18. The method of claim 17 wherein the step of inserting includes a liner having formed on an end opposite to the distal end a mouth piece having a generally circular opening for receiving a teat.

19. The method of claim 18 wherein the step of inserting includes a shell having a circumferential annular collar formed on an end of the shell having the mouth piece opening and wherein said liner includes a circumferentially extending collar receiving member configured to enclose and be rigidly supported by said circumferential annular collar.

\* \* \* \* \*